United States Patent [19]

Hanada et al.

[11] Patent Number: 4,942,212

[45] Date of Patent: Jul. 17, 1990

[54] POLYURETHANE RESIN AND HEAT-SENSITIVE RECORDING MEDIUM

[75] Inventors: Kazuyuki Hanada, Washinomiyo; Kohichi Kuroda, Tokyo; Iwao Misaizu, Ageo; Masashi Kashimura, Tokyo; Tomoko Goto, Kawaguchi; Katsumi Kuriyama, Koshigaya, all of Japan

[73] Assignees: Dainichiseika Color & Chemicals Mfg. Co., Ltd.; Ukima Colour & Chemicals Mfg. Co., Ltd., both of Tokyo, Japan

[21] Appl. No.: 280,583

[22] Filed: Dec. 6, 1988

[30] Foreign Application Priority Data

Jan. 20, 1988 [JP] Japan ................... 63-8234

[51] Int. Cl.$^5$ ............................. C08G 77/04
[52] U.S. Cl. .................... 528/28; 525/440; 525/446; 525/453; 525/458; 525/459; 525/443
[58] Field of Search ............... 528/28; 525/440, 446, 525/453, 458, 459, 443

[56] References Cited

U.S. PATENT DOCUMENTS 4,728,690 3/1988 Lammerting et al. ............. 528/28
4,766,194 8/1988 Robertson ......................... 528/28

*Primary Examiner*—Melvin I. Marquis
*Attorney, Agent, or Firm*—Oblon, Spivak, McClelland, Maier & Neustadt

[57] ABSTRACT

A polyurethane resin is composed of a polyol component, a polyisocyanate component and optionally, a chain extender component. At least a portion of the polyol component or chain extender component is a siloxane polyol component represented by the following formula (1) and/or formula (2):

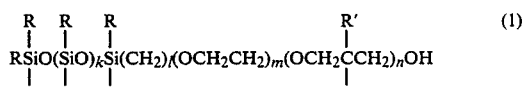

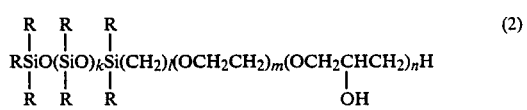

wherein R means an alkyl group, R' denotes a hydrogen atom or $C_{1-5}$ alkyl group, k, l and m stand for 1–250, 0–5 and 0–50 respectively, and n is an integer of 1–3 in the formula (1) and an integer of 2–3 in the formula (2). A thermal recording material containing the polyurethane resin as a heat-resistant layer is also disclosed.

10 Claims, No Drawings

POLYURETHANE RESIN AND HEAT-SENSITIVE RECORDING MEDIUM

BACKGROUND OF THE INVENTION (1) Field of the Invention:

This invention relates to polyurethane resins and heat-sensitive recording media (hereinafter called "thermal recording materials"), and more specifically to silicone-modified polyurethane resins excellent in stick-free property, antiblocking property and flexibility and also to thermal recording materials making use of such resins.

(2) Description of the Related Art:

Polyurethane resins have already found a wide variety of utility as binders for various coating agents, coating compositions and inks, films, formed and molded articles, etc. Polyurethane resins suitable for various applications have been proposed.

These polyurethane resins can be obtained basically by reacting a polyol component, a polyisocyanate component and if necessary, a chain extender. Polyurethane resins of various physical properties have been provided depending on the kinds of these individual components, their combinations and the like.

For some applications of polyurethane resins, for example, heat-resistant layers of thermal recording materials and magnetic recording media, stick-free property to thermal heads, antiblocking property between films themselves, etc. are however required in some instances. In general, sufficient flexibility is also required for these applications in order to permit the formation of thin films.

Introduction of one or more aromatic components and many polar bonds into a polyurethane chain is however indispensable to impart high tack-free property and the like. In many instances, this has led to sacrifice of flexibility.

There is accordingly an outstanding demand for the development of a polyurethane resin excellent in high-temperature tack-free property, antiblocking property and the like and superb in flexibility.

SUMMARY OF THE INVENTION

The present inventors have carried out an extensive investigation with a view toward solving the above-mentioned drawbacks of the conventional techniques and hence meeting the aforementioned demand. As a result, it has been found that this objective can be achieved by forming a polyurethane resin with a specific polyurethane component.

In one aspect of this invention, there is thus provided a polyurethane resin derived from a polyol component, a polyisocyanate component and optionally, a chain extender component. At least a portion of the polyol component or chain extender component is a siloxane polyol component represented by the following formula (1) and/or formula (2):

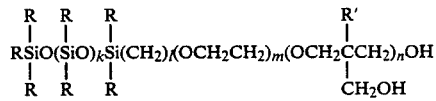

-continued

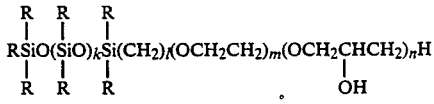

wherein R means an alkyl group, R' denotes a hydrogen atom or $C_{1-5}$ alkyl group, k, l and m stand for 1-250, 0-5 and 0-50 respectively, and n is an integer of 1-3 in the formula (1) and an integer of 2-3 in the formula (2).

In another aspect of this invention, there is also provided a thermal recording material containing the polyurethane resin as a heat-resistant layer.

Bonding of polysiloxane bonds as pendants to the backbone of a polyurethane resin has made it possible to provide a polyurethane resin excellent in tack-free property, antiblocking property and the like while retaining the excellent flexibility of the former polyurethane resin.

The polyurethane resin according to this invention has superb solubility in various solvents and can provide film excellent not only in flexibility but also in high-temperature tack-free property, anti-blocking property and the like, so that it is useful for various applications, for example, as a binder for the formation of magnetic layers of magnetic recording media such as magnetic tapes, a back-coating material applied to the back sides of such magnetic recording media, a binder for transfer films, a binder for the formation of heat-resistant layers effective for the prevention of sticking of a thermal head, a base material for synthetic leather, a fiber-coating agent, a surface treatment agent, a binder for the formation of release layers such as parting paper, a binder for coating compositions and printing inks, etc.

Use of the polyurethane resin according to this invention, which contains residual groups of the specific siloxane compound, for the formation of a heat-resistant layer for a thermal recording material renders the thermal recording material free from the sticking problem of a thermal head thereto.

DESCRIPTION OF PREFERRED EMBODIMENTS

This invention will hereinafter be described in more detail based on certain preferred embodiments of this invention.

The polyurethane resin containing as pendants residual groups of the siloxane compound of the above formula (1) and/or that of the above formula (2) can be obtained by using the siloxane compound of the above formula (1) and/or that of the above formula (2) as the whole portion or a portion of a polyol or chain extender when the polyurethane resin is obtained by reacting the polyol, a polyisocyanate and if necessary, the chain extender, etc.

The siloxane compounds of the formulae (1) and (2) are sold commercially and readily available on the market these days. These commercial siloxane compounds are all useful in the practice of this invention. Also usable in this invention may include intermediates obtained by reacting one of such siloxane compounds and a polyisocyanate, which will be described subsequently, in such a way that at least either reactive groups of the siloxane compound or isocyanate groups of the polyisocyanate are left over, for example, an intermediate obtained by reacting a bifunctional siloxane compound and a polyfunctional polyisocyanate with isocyanate groups richer or in contrast, an intermediate obtained by reacting them with the reactive group of the siloxane compound richer.

Polyols, which have heretofore been known to be useful for the production of polyurethanes, can all be employed as polyols usable in combination with the siloxane compounds of the formula (1) and/or those of the formula (2). For example, preferred are those containing hydroxyl groups as terminal groups and having a molecular weight in a range of 300–4,000, including:
Polyethylene adipate,
Polyethylenepropylene adipate,
Polyethylenebutylene adipate,
Polydiethylene adipate,
Polybutylene adipate,
polyethylene succinate,
Polybutylene succinate,
Polyethylene sebacate,
Polybutylene sebacate,
Polytetramethyleneether glycol,
Poly-$\epsilon$-caprolactonediol,
Polyhexamethylene adipate, and
Polypropylene glycol; and
those containing a suitable proportion of polyoxyethylene chains in the above polyols.

Organopolyisocyanates which have been known to date can all be used. The following organopolyisocyanates may be mentioned by way of example as preferred ones:
4,4'-Diphenylmethane diisocyanate (MDI),
Hydrogenated MDI,
Isophorone diisocyanate,
1,3-Xylylene diisocyanate,
1,4-Xylylene diisocyanate,
2,4-Tolylene diisocyanate,
2,6-Tolylene diisocyanate,
1,5-Naphthalene diisocyanate,
m-Phenylene diisocyanate, and
p-Phenylene diisocyanate.

It is of course possible to use urethane prepolymers and the like, which are each obtained by reacting one of these organopolyisocyanate with a polyol or polyamine of a low molecular weight.

Chain extenders which have been known conventionally can all be used. Preferred examples may include:
Ethylene glycol,
propylene glycol,
Diethylene glycol,
1,4-Butanediol,
1,6-Hexanediol,
Ethylenediamine,
1,2-Propylenediamine,
Trimethylenediamine,
Tetramethylenediamine,
Hexamethylenediamine,
Decamethylenediamine,
Isophoronediamine,
m-Xylylenediamine,
Hydrazine, and
Water.

Among polyurethane resins containing as pendants residual groups of a siloxane compound which is obtained from materials such as those mentioned above, particularly preferred are those containing pendant residual groups of a siloxane compound in a proportion of about 1.0–50 wt. % per polyurethane resin molecule. If the proportion of the pendant residual groups of the siloxane compound is smaller than about 1.0 wt. %, stick-free property, antiblocking property and the like cannot be brought about to sufficient extents, thereby failing to achieve the objects of the present invention. If the proportion exceeds 50 wt. % on the other hand, the resulting polyurethane resin fails to have sufficient flexibility. It is hence not preferred to contain such pendant groups in any proportion outside the above range.

The preferable molecular weight is 20,000–500,000 with 20,000–250,000 being most preferred.

In this invention, it is also possible to react the siloxane compound and polyisocyanate in a state rich in the isocyanate so that a polyurethane resin having at least one free isocyanate group is obtained and is then used in combination with another film-forming resin as a modifier for the last-mentioned film-forming resin.

The polyurethane resins according to this invention, which contain residual groups of such siloxane compounds as pendants, can be obtained easily by a production process known to date. These polyurethane resins may be produced without solvent or in an organic solvent. It is however advantageous from the process standpoint to produce them in an organic solvent, because the resultant solutions can be used for various applications as they are.

Preferred as such organic solvents are methyl ethyl ketone, methyl n-propyl ketone, methyl isobutyl ketone, diethyl ketone, methyl formate, ethyl formate, propyl formate, methyl acetate, ethyl acetate, butyl acetate, etc. It is also feasible to use acetone, cyclohexane, tetrahydrofuran, dioxane, methanol, ethanol, isopropyl alcohol, butanol, toluene, xylene, dimethylformamide, dimethylsulfoxide, perchloroethylene, trichloroethylene, methyl cellosolve, butyl cellosolve, cellosolve acetate, etc.

In spite of the superb tack-free property and antiblocking property of the polyurethane resins according to this invention, they are soluble in various organic solvents and can therefore form excellent flexible films.

The polyurethane resins according to this invention therefore have superb solubility in various solvents and can provide films excellent not only in flexibility but also in high-temperature tack-free property, antiblocking property and the like, so that they are useful for various applications, for example, as binders for the formation of magnetic layers of magnetic recording media such as magnetic tapes, back-coating materials applied to the back sides of such magnetic recording media, binders for transfer films, binders for the formation of heat-resistant layers effective for the prevention of sticking of a thermal head, base materials for synthetic leather, fiber-coating agents, surface treatment agents, binders for the formation of release layers such as parting paper, binders for coating compositions and printing inks, etc.

As one example of applications of the polyurethane resins according to this invention, formation of a heat-resistant layer of a thermal recording material such as a thermal transfer film will next be described.

The term "thermal recording material" means a recording material which has a transfer ink layer or sublimation transfer dye layer on one side of a base sheet such as a polyester film and is heated in a pattern of a mark from the back side by a thermal head to transfer the ink or dye onto a receiving material thereby to reproduce the mark in a single color or multiple colors. Upon transfer by means of the thermal head, the thermal head sticks on the back side so that various troubles are developed.

The polyurethane resins according to this invention have excellent flexibility and in particular, superb tack-free property especially even at elevated temperatures, and are therefore most suitable for such an application. Needless to say, the above application is merely illustrative and the application of the polyurethane resins of this invention is by no means limited to the above example.

It is preferable for the formation of the heat-resistant layer to use a coating formulation which is formed by either dissolving or dispersing the polyurethane resin of this invention either singly or in combination with one or more other resins in a medium such as that described above. The total concentration of film-forming resins in a coating formulation may preferably be from about 10 wt. % to about 55 wt. %. The polyurethane resin according to this invention, which contains as pendants residual groups of the particular siloxane compound, may be used in a proportion of from about 1 to about 100 parts by weight per 100 parts by weight of these film-forming resins.

Various film-forming resins which have been known to date can be used in combination with the polyurethane resin of this invention. Such conventional resins are all usable. Examples of such film-forming resins include polyvinyl resins, polyvinylidene resins, vinyl chloride/vinyl acetate/vinyl alcohol copolymer resins, alkyd resins, epoxy resins, acrylonitrile-butadiene resins, polyurethane resins, polyurea resins, nitrocellulose resins, polybutyrate resins, polyester resins, fluorine resins, melamine resins, urea resins, acrylic resins, polyamide resins, etc. Resins containing isocyanate-reactive groups in their structures may be used preferably, in particular, when the polyurethane resin of this invention contains free isocyanate groups as pendants. These resins may be used either singly or in combination and as either a solution or a dispersion in an organic solvent.

So long as the above-described components are contained as essential components, a coating formulation adapted to form a heat-resistant layer may contain auxiliary components in addition to the above components, for example, one or more desired additives such as pigment, extending pigment, plasticizer, antistatic agent, surface active agent, lubricant, crosslinking agent, age resister, stabilizer, foaming agent and/or defoaming agent.

Heat-resistant layers may each be formed by any method known to date, preferably, to a thickness of from about 0.1 μm to about 10 μm.

Any conventional base sheet can be used for the production of the thermal recording material according to this invention. For example, polyester films, polypropylene films, cellulose triacetate films, cellulose diacetate films, polycarbonate resin and the like can be used as desired.

The thermal recording material can be produced successfully in a manner known per se in the art except for the use of such a polyurethane resin for the formation of its heat-resistant layer. For example, the thermal recording layer can be formed by a method known to date from a binder resin, a dye or pigment, an organic solvent, and various other additives as needed.

For example, as the binder resin, it is possible to use a resin such as one of the aforementioned film-forming resins. Any one of the organic solvents described above may be used as the organic solvent. As exemplary pigments, may be used organic pigments such as azo, phthalocyanin, quinacridone and polycyclic pigments and inorganic pigments such as carbon black, iron oxides, chrome yellow and cadmium sulfide. On the other hand, various dyes known to date, including sublimate dyes and disperse dyes, can be used as dyes.

In thermal recording materials according to this invention, their heat-resistant layers have high heat resistance and low heat tackiness of such degrees not available by any conventional techniques while retaining various good properties, for example, solubility, flexibility, strength, and electrical, chemical and physical properties. In contrast to thermal recording materials according to the conventional techniques, thermal recording materials of this invention can therefore be used with extremely good stability without softening and/or sticking of their heat-resistant layers under heat from a thermal head, so that the aforementioned drawbacks of the conventional techniques have been solved.

Further, the pendant residual groups of the siloxane compound in each polyurethane resin according to this invention do not form the backbone of the film-forming resin but are bonded as side chains to the film-forming resin. Unlike conventional heat-resistant resins, the polyurethane resins do not lower the excellent flexibility which film-forming resins have inherently. The polyurethane resins useful for the production of thermal recording materials in this invention are not limited to their single use but can be used freely in combination with any film-forming resin or resins, thereby bringing about a further advantage that thermal recording materials with a heat-resistant layer made of one or more of various film-forming resins and having high heat resistance and heat tackiness can be provided without pushing up their production cost.

Since the heat-resistant layers of thermal recording materials of this invention are formed of a polyurethane resin such as that described above, they are free from the drawbacks of the conventional techniques that the heat-resistant component is allowed to breed out to the surfaces of the heat-resistant layers along the passage of time thereby to smear and wear thermal heads.

The present invention will hereinafter be described more specifically by the following Examples and Comparative Examples, in which all designations of "part" or "parts" and "%" mean part or parts by weight and wt. %.

Example 1:

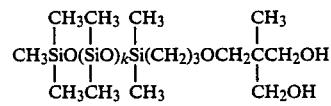

wherein k is a value to give a molecular weight of 5,200.

Dissolved in a mixed solvent composed of 200 parts of methyl ethyl ketone and 50 parts of dimethylformamide were 150 parts of polydimethylsiloxanepolyol (molecular weight: 5,200) having the above-defined structure and 12 parts of 1,4-butanediol. While thoroughly stirring the contents at 60° C., a solution of 42 parts of hydrogenated MDI in 128 parts of dimethylformamide was gradually added dropwise. After completion of the dropwise addition, they were reacted at 80° C. for 5 hours to obtain a polyurethane resin of this invention in the form of a solution.

The solution had a solid content of 35% and a viscosity of 16,500 cps (at 25° C.).

A film was obtained from the solution, whose strength (kg/cm$^2$) at break, elongation (%) at break and softening point were 360, 350 and 92° C. respectively.

Example 2:

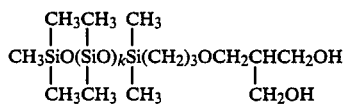

wherein k is a value to give a molecular weight of 5,200.

Dissolved in a mixed solvent composed of 250 parts of methyl ethyl ketone and 50 parts of dimethylformamide were 75 parts of polydimethylsiloxanepolyol (molecular weight: 5,200) having the above-defined structure and 15 parts of 1,4-butanediol. While thoroughly stirring the contents at 60° C., a solution of 56 parts of hydrogenated MDI in 110 parts of dimethylformamide was gradually added dropwise. After completion of the dropwise addition, they were reacted at 80° C. for 5 hours to obtain a polyurethane resin of this invention in the form of a solution.

The solution had a solid content of 35% and a viscosity of 31,000 cps (at 25° C.).

A film was obtained from the solution, whose strength (kg/cm$^2$) at break, elongation (%) at break and softening point were 460, 400 and 105° C. respectively.

Example 3:

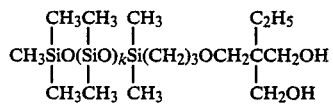

wherein k is a value to give a molecular weight of 4,500.

Dissolved in a mixed solvent composed of 150 parts of methyl ethyl ketone and 100 parts of dimethylformamide were 4 parts of polydimethylsiloxanepolyol (molecular weight: 4,500) having the above-defined structure, 146 parts of polybutylene adipate (molecular weight: 2,000) and 10 parts of 1,4-butanediol. While thoroughly stirring the contents at 60° C., a solution of 47 parts of hydrogenated MDI in 134 parts of dimethylformamide was gradually added dropwise. After completion of the dropwise addition, they were reacted at 80° C. for 6 hours to obtain a polyurethane resin of this invention in the form of a solution.

The solution had a solid content of 35% and a viscosity of 45,000 cps (at 25° C.).

A film was obtained from the solution, whose strength (kg/cm$^2$) at break, elongation (%) at break and softening point were 450, 410 and 90° C. respectively.

Example 4:

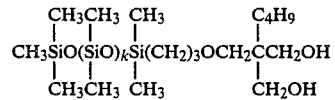

wherein k is a value to give a molecular weight of 4,800.

Dissolved in a mixed solvent composed of 150 parts of methyl ethyl ketone and 100 parts of dimethylformamide were 4 parts of polydimethylsiloxanepolyol (molecular weight: 4,800) having the above-defined structure, 146 parts of polybutylene adipate (molecular weight: 2,000) and 10 parts of 1,4-butanediol. While thoroughly stirring the contents at 60° C., a solution of 46 parts of hydrogenated MDI in 134 parts of dimethylformamide was gradually added dropwise. After completion of the dropwise addition, they were reacted at 80° C. for 6 hours to obtain a polyurethane resin of this invention in the form of a solution.

The solution had a solid content of 35% and a viscosity of 48,000 cps (at 25° C.).

A film was obtained from the solution, whose strength (kg/cm$^2$) at break, elongation (%) at break and softening point were 420, 430 and 95° C. respectively.

Example 5:

A polyurethane resin of this invention was obtained in the form of a solution in a similar manner as in Example 1 except that a siloxane compound of the following structure was used in the same amount in place of the siloxane compound in Example 1.

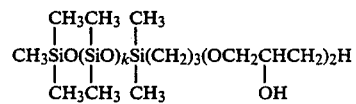

wherein k is a value to give a molecular weight of 5,200.

The solution had a solid content of 35% and a viscosity of 48,000 cps (at 25° C.).

A film was obtained from the solution, whose strength (kg/cm$^2$) at break, elongation (%) at break and softening point were 420, 430 and 95° C. respectively.

Example 6:

A polyurethane resin of this invention was obtained in the form of a solution in a similar manner as in Example 2 except that a siloxane compound of the following structure was used in the same amount in place of the siloxane compound in Example 2.

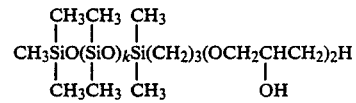

wherein k is a value to give a molecular weight of 5,200.

The solution had a solid content of 35% and a viscosity of 48,000 cps (at 25° C.).

A film was obtained from the solution, whose strength (kg/cm$^2$) at break, elongation (%) at break and softening point were 420, 430 and 95° C. respectively.

Example 7:

A polyurethane resin of this invention was obtained in the form of a solution in a similar manner as in Example 3 except that a siloxane compound of the following structure was used in the same amount in place of the siloxane compound in Example 3.

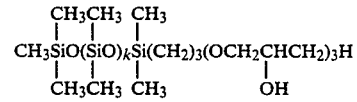

wherein k is a value to give a molecular weight of 5,200.

The solution had a solid content of 35% and a viscosity of 48,000 cps (at 25° C.).

A film was obtained from the solution, whose strength (kg/cm$^2$) at break, elongation (%) at break and softening point were 420, 430 and 95° C. respectively.

Example 8:

A polyurethane resin of this invention was obtained in the form of a solution in a similar manner as in Example 4 except that a siloxane compound of the following structure was used in the same amount in place of the siloxane compound in Example 4.

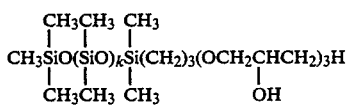

wherein k is a value to give a molecular weight of 5,200.

The solution had a solid content of 35% and a viscosity of 48,000 cps (at 25° C.).

A film was obtained from the solution, whose strength (kg/cm$^2$) at break, elongation (%) at break and softening point were 420, 430 and 95° C. respectively.

Comparative Example 1:

Dissolved in a mixed solvent composed of 200 parts of methyl ethyl detone and 50 parts of dimethylformamide were 150 parts of polybutylene adipate (molecular weight: 2,000) and 15 parts of 1,4-butane-diol. While thoroughly stirring the contents at 60° C., a solution of 62 parts of hydrogenated MDI in 171 parts of dimethylformamide was gradually added dropwise. After completion of the dropwise addition, they were reacted at 80° C. for 6 hours to obtain a polyurethane resin in the form of a solution.

The solution had a solid content of 35% and a viscosity of 32,000 cps (at 25° C.).

A film was obtained from the solution, whose strength (kg/cm$^2$) at break, elongation (%) at break and softening point were 450, 480 and 102° C. respectively.

Incidentally, the softening point in each of the above Examples and Comparative Example was determined by cutting the corresponding film into a narrow strip, hanging in a Geer oven the strip with a weight applied to a lower edge portion thereof to give a weight of 450 g/cm$^2$, heating the oven at a rate of 2° C./min and then recording a temperature at which the elongation of the strip increased abruptly or the strip was cut off.

Comparative Example 2:

Dissolved in 1,000 parts of toluene were 100 parts of a silicone resin "KS-841" (trade name; product of Shin-Etsu Chemical Co., Ltd.) and 1 part of a catalyst "PL-7", whereby a coating formulation of the silicone resin was prepared.

Examples 9–16 & Comparative Examples 4–6:

Coating formulations of the following compositions were prepared separately. They were separately applied to the back sides of 15-μm thick polyester films, on which a thermal recording layer had been formed in advance, by a gravure coater to give a dry coat thickness of 0.5 μm. The solvent was dried up in a dryer, so that heat-resistant layers were formed. The thus-coated films were then cut into a predetermined width to produce thermal recording materials, which made use of the polyurethane resins according to this invention respectively, and comparative thermal recording materials.

Example 9:

Resin solution of Example 1: 100 parts
Methyl ethyl ketone: 100 parts

Example 10

Resin solution of Example 2: 100 parts
Methyl ethyl ketone: 100 parts

Example 11:

Resin solution of Example 3: 100 parts
Methyl ethyl ketone: 100 parts

Example 12:

Resin solution of Example 4: 100 parts
Methyl ethyl ketone: 100 parts

Example 13:

Resin solution of Example 5: 100 parts
Methyl ethyl ketone: 100 parts

Example 14:

Resin solution of Example 6: 100 parts
Methyl ethyl ketone: 100 parts

Example 15:

Resin solution of Example 7: 100 parts
Methyl ethyl ketone: 100 parts

Example 16:

Resin solution of Example 8: 100 parts
Methyl ethyl ketone: 100 parts

Comparative Example 4:

Resin solution of Comp. Ex. 1: 100 parts
Methyl ethyl ketone: 100 parts

Comparative Example 5:

Resin solution of Comp. Ex. 1: 100 parts
Talc: 5 parts
Methyl ethyl ketone: 120 parts Comparative Example 6:

Resin solution of Comp. Ex. 2: 100 parts

Evaluation:

Characteristics of the thermal recording materials obtained respectively in Examples 9–16 and Comparative Examples 4–6 were as shown in Table 1.

TABLE 1

| | Coefficient of friction | Sticking resistance | Head smear resistance |
|---|---|---|---|
| Example 9 | 0.125 | 5 | 5 |
| Example 10 | 0.173 | 5 | 5 |
| Example 11 | 0.185 | 5 | 5 |
| Example 12 | 0.203 | 5 | 5 |
| Example 13 | 0.115 | 5 | 5 |
| Example 14 | 0.162 | 5 | 5 |
| Example 15 | 0.198 | 5 | 5 |
| Example 16 | 0.205 | 5 | 5 |
| Comp. Ex. 4 | 0.612 | 1 | 5 |
| Comp. Ex. 5 | 0.352 | 3 | 2 |
| Comp. Ex. 6 | 0.195 | 5 | 2 |

Each coefficient of friction in Table 1 is a measurement datum of the coefficient of friction between an untreated polyethylene terephthalate surface and the heat-resistant layer formed in the corresponding Example or Comparative Example.

Each sticking resistance was determined by visually ranking, in 5 stages, the releasability of a thermal head from the corresponding thermal recording material when the thermal recording material was used in an actual thermal recording test and the thermal head was pressed against the thermal recording material. Score of 5 was given to those showed best sticking resistance.

Each hear smear resistance was determined by using the corresponding thermal recording material in an actual thermal recording test, observing the degree of smear of the thermal head and then ranking it in fiber stages, score of 5 being given to those showed least smear.

From the above results, it is clearly understood that thermal recording materials making use of a polyurethane resin according to this invention are equipped with a heat-resistant layer having a low coefficient of friction and high sticking resistance and head smear resistance.

What is claimed is:

1. A polyurethane resin derived from a polyol component and a polyisocyanate component, wherein at least a portion of the polyol component is a siloxane polyol component having the formula (1) or (2) or both:

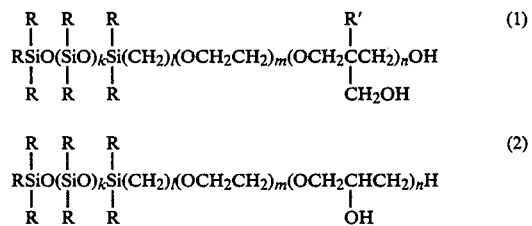

wherein R is an alkyl group, R' is hydrogen or a $C_1$–$C_5$ alkyl group, k, l and m are integers of 1–250, 0–5 and 0–15, respectively, and n is an integer of 1–3 in formula (1) and an integer of 2–3 in formula (2), said siloxane polyol component being present in an amount sufficient to provide said polyurethane resin with tack-free and anti-blocking properties, while retaining resin flexibility.

2. The polyurethane resin as claimed in claim 1, further comprising a chain extender component.

3. The polyurethane resin as claimed in claim 2, wherein at least a portion of the chain extender is a siloxane polyol component represented by the following formula (1) and/or formula (2):

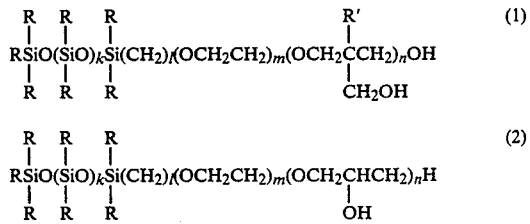

wherein R means an alkyl group, R' denotes a hydrogen atom or $C_{1-5}$ alkyl group, k, l and m stand for 1–250, 0–5 and 0–50 respectively, and n is an integer of 1–3 in the formula (1) and an integer of 2–3 in the formula (2).

4. The polyurethane resin as claimed in claim 1, wherein said polyol component further contains, in combination with said siloxane compounds, a polyol containing hydroxyl groups as terminal groups and having a molecular weight in the range of 300–4000.

5. The polyurethane resin as claimed in claim 4, wherein said polyol is selected from the group consisting of polyethylene adipate, polyethylene propylene adipate, polyethylene butylene adipate, polydiethylene adipate, polybutylene adipate, polyethylene succinate, polybutylene succinate, polyethylene sebacate, polybutylene sebacate, polytetramethylene ether glycol, poly-ε-caprolactonediol, polyhexamethylene adipate, and polypropylene glycol, and any of the above also containing a proportion of polyoxyethylene chains.

6. The polyurethane resin as claimed in claim 1, wherein said polyisocyanate component is selected from the group consisting of 4,4,'-diphenylmethane diisocyanate, hydrogenated 4,4'-diphenylmethane diisocyanate, isophorone diisocyanate, 1,3-xylylene diisocyanate, 1,4-xylylene diisocyanate, 2,4-tolylene diisocyanate, 2,6-tolylene diisocyanate, 1,5-naphthalene diisocyanate, m-phenylene diisocyanate and p-phenylene diisocyanate.

7. The polyurethane resin as claimed in claim 3, wherein said chain extender is selected from the group consisting of ethylene glycol, propylene glycol, diethylene glycol, 1,4-butanediol, 1,6-hexanediol, ethylenediamine, 1,2-propylenediamine, trimethylenediamine, tetramethylenediamine, hexamethylenediamine, decamethylenediamine, isophoronediamine, m-xylylene-diamine, hydrazine and water.

8. The polyurethane resin as claimed in claim 1, wherein said siloxane compound is used in an amount of about 1.0–50 wt. %.

9. The polyurethane resin as claimed in claim 1, having a molecular weight of from 20,000–500,000.

10. The polyurethane resin as claimed in claim 9, having a molecular weight of from 20,000–250,000.

* * * * *